(12) United States Patent
Wang et al.

(10) Patent No.: US 10,915,780 B2
(45) Date of Patent: Feb. 9, 2021

(54) ERROR BLOCK DETERMINATION

(71) Applicant: ENTIT SOFTWARE LLC, Sanford, NC (US)

(72) Inventors: Jin Wang, Shanghai (CN); Zhu Jing Wu, Shanghai (CN); Jia-Wen Li, Shanghai (CN); Yuguang Zhao, Shanghai (CN); Jun Lu, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 87 days.

(21) Appl. No.: 16/071,721

(22) PCT Filed: Jan. 29, 2016

(86) PCT No.: PCT/CN2016/072664
§ 371 (c)(1),
(2) Date: Jul. 20, 2018

(87) PCT Pub. No.: WO2017/128273
PCT Pub. Date: Aug. 3, 2017

(65) Prior Publication Data
US 2019/0057277 A1 Feb. 21, 2019

(51) Int. Cl.
*G06K 9/46* (2006.01)
*G06K 9/62* (2006.01)
(Continued)

(52) U.S. Cl.
CPC ............ *G06K 9/4604* (2013.01); *G06K 9/03* (2013.01); *G06K 9/6202* (2013.01); *G06K 9/6269* (2013.01); *G06T 7/0002* (2013.01); *G06T 7/13* (2017.01); *G06F 3/0481* (2013.01); *G06F 3/04817* (2013.01); *G06K 2209/01* (2013.01); *G06T 7/60* (2013.01); *G06T 7/90* (2017.01);
(Continued)

(58) Field of Classification Search
CPC ...... G06K 9/4604; G06K 9/03; G06K 9/6269; G06K 9/6202; G06K 2209/01; G06T 7/0002; G06T 7/13; G06T 2207/30242; G06T 2207/20081; G06T 7/60; G06T 7/90; H04L 41/0631; G06F 3/04817; G06F 3/0481
See application file for complete search history.

(56) References Cited

U.S. PATENT DOCUMENTS 7,305,129 B2   12/2007   Chellapilla et al.
8,031,940 B2   10/2011   Vincent et al.
(Continued)

FOREIGN PATENT DOCUMENTS

CN   103458300 A   12/2013
CN   103530561     1/2014
CN   103019687 B   6/2016

OTHER PUBLICATIONS

International Searching Authority., International Search Report and Written Opinion dated Oct. 24, 2016 for PCT Application No. PCT/CN2016/072664 Filed Jan. 29, 2016, 13 pages.
(Continued)

*Primary Examiner* — Helen Zong

(57) ABSTRACT

In some examples, a window in an image may be identified. At least one property of the window may be identified. Based on the at least one property, whether the window is an error block may be determined.

20 Claims, 4 Drawing Sheets

(51) Int. Cl.
*G06T 7/13* (2017.01)
*G06T 7/00* (2017.01)
*G06K 9/03* (2006.01)
*G06T 7/90* (2017.01)
*G06F 3/0481* (2013.01)
*G06T 7/60* (2017.01)
*H04L 12/24* (2006.01)

(52) U.S. Cl.
CPC ............... *G06T 2207/20081* (2013.01); *G06T 2207/30242* (2013.01); *H04L 41/0631* (2013.01)

(56) References Cited

U.S. PATENT DOCUMENTS

| | | | |
|---|---|---|---|
| 8,818,033 B1 | 8/2014 | Liu et al. | |
| 9,152,860 B2 | 10/2015 | Cervin et al. | |
| 2006/0172275 A1* | 8/2006 | Cohen | G09B 7/00 434/350 |
| 2012/0144282 A1 | 6/2012 | Loeb | |
| 2014/0193029 A1 | 7/2014 | Vassilieva | |
| 2014/0325409 A1* | 10/2014 | Geva | G06F 9/451 715/765 |
| 2015/0003667 A1 | 1/2015 | Rowley et al. | |
| 2015/0294191 A1* | 10/2015 | Zhang | G06N 20/00 382/160 |
| 2015/0365562 A1* | 12/2015 | Tamura | H04N 1/40 358/474 |
| 2016/0080360 A1* | 3/2016 | Child | H04L 63/0815 726/6 |
| 2016/0092736 A1* | 3/2016 | Mai | G06K 9/00624 |
| 2016/0330346 A1* | 11/2016 | Hayashi | H04N 1/00891 |
| 2016/0349928 A1* | 12/2016 | Li | G06K 9/00456 |
| 2017/0039100 A1* | 2/2017 | Mashimo | G06F 11/0706 |
| 2017/0150213 A1* | 5/2017 | Cremer | H04N 21/23418 |
| 2017/0193542 A1* | 7/2017 | Rapaka | G06F 16/24578 |
| 2018/0211108 A1* | 7/2018 | Lahmann | G06T 7/10 |
| 2020/0065605 A1* | 2/2020 | Manako | G06T 7/11 |

OTHER PUBLICATIONS

Muchene and Luli, The Big Picture: Using Desktop Imagery for Detection of Insider Threats, 37 pages.
Bay, Herbert; et al.; "SURF: Speeded Up Robust Features"; Computer Vision and Image Understanding (CVIU); vol. 110, No. 3; 2008; 14 pages.
Wikipedia; "Colorfulness;" https://en.wikipedia.org/wiki/Colorfulness; downloaded Jan. 2, 2020; 6 pages.
Wikipedia; "Speeded up robust features;" https://en.wikipedia.org/wiki/Speeded_up_robust_features; downloaded Jan. 2, 2020; 5 pages.

* cited by examiner

ERROR BLOCK DETERMINATION

BACKGROUND

Computing system components, such as applications, servers, databases, etc., may exhibit a variety of errors. In some examples, when an error occurs, an error block window may pop up on a desktop screen and show an error message, which may provide information about the error. This information may be helpful for a user or information technology (IT) professional to understand the error and perform root cause analysis.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

In some examples, as mentioned above, when an error occurs with a component of a computing system, an error block window may pop up on a desktop screen and show an error message. In some examples, an image of the desktop screen may be obtained, and character recognition (OCR) may be performed to extract text from an error message in the error block in the image. However, such desktop screen images may additionally include various other features besides error blocks, including backgrounds, graphical features, text, windows, toolbars, icons, etc. Therefore, OCR may capture text that is not associated (e.g. outside) the error block. As a result, the recognized text may include irrelevant text such that the recognized text as a whole does not make sense.

Accordingly, the present disclosure provides examples in which error blocks may be identified in images, so that OCR is performed on error blocks, and unintended cases of OCR performed on parts of the images other than error blocks are reduced. Therefore, accuracy in OCR may be greatly increased. The error blocks may be identified based on the identification of properties normally associated with error blocks. For example, windows may be identified by identifying borders and title bars in an image. In some examples, the saturation of the title bar, the number of widgets in the window, and the size of the window. Based on these properties, whether the window is an error block may be determined.

Figure 1:
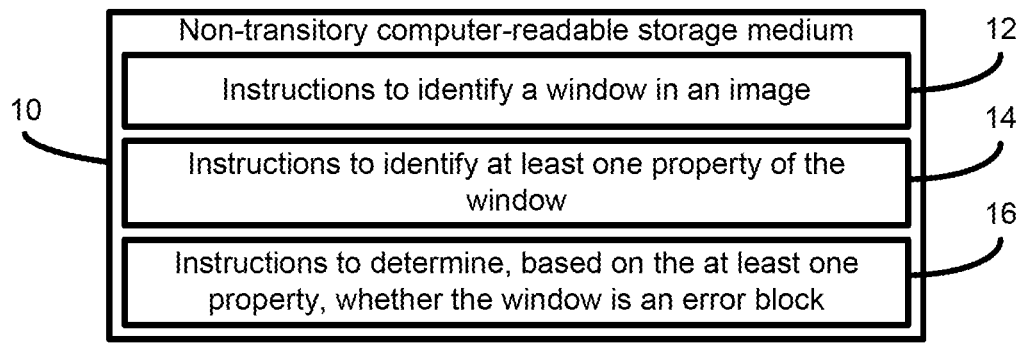
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to identify a window in an image. The non-transitory computer readable storage medium 10 may include instructions 14 executable by a processor to identify at least one property of the window. The non-transitory computer readable storage medium 10 may include instructions 16 executable by a processor to determine, based on the at least one property, whether the window is an error block. A window is a graphical element that has a border and that is to be displayed on a graphical user interface. A window may or may not include a title bar. An error block is a window that provides to a user a notification regarding an error.

Figure 2:
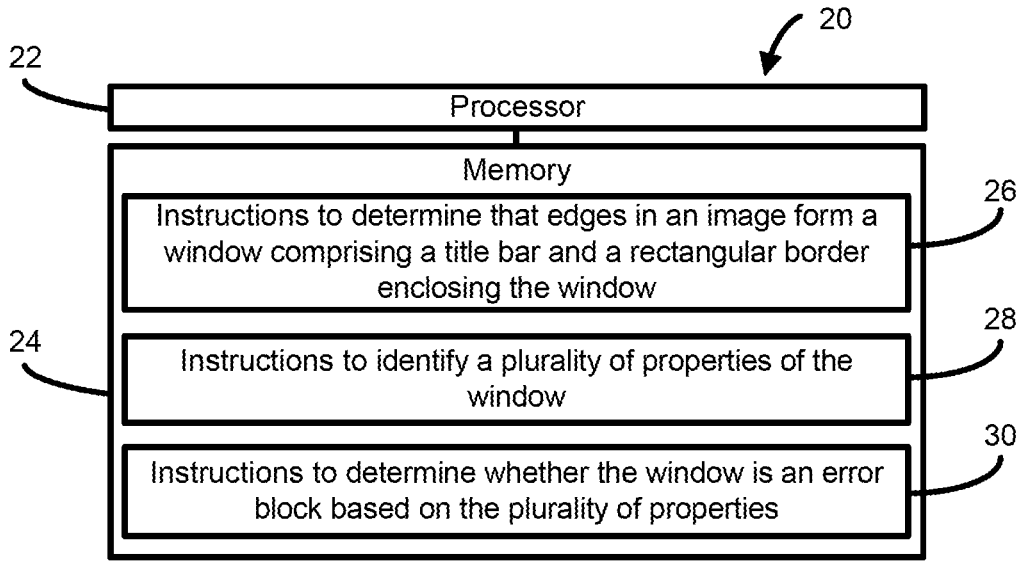
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 24 executable by the processor to determine that edges in an image form a window comprising a title bar and a rectangular border enclosing the window. The memory 24 may include instructions 26 executable by the processor to identify a plurality of properties of the window. The memory 24 may include instructions 28 executable by the processor to determine whether the window is an error block based on the plurality of properties.

Figure 3:
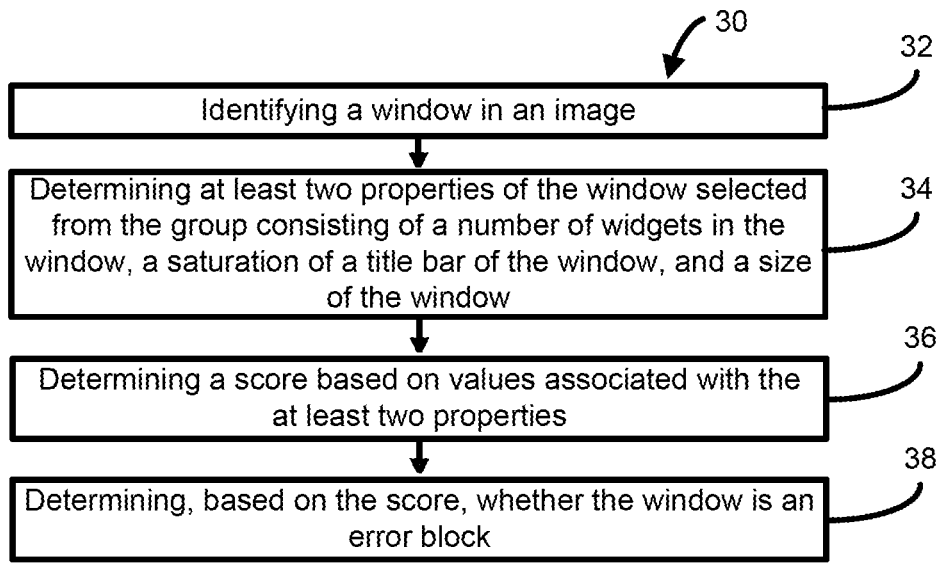
FIGS. 3 and 6 are flow diagrams illustrating methods according to some examples.

FIG. 3 is a flow diagram illustrating a method 30 according to some examples. The following may be performed by a processor. At 32, a window in an image may be identified. At 34, at least two properties of the window may be determined that are selected from the group consisting of a number of widgets in the window, a saturation of a title bar of the window, and a size of the window. At 36, a score based on values associated with the at least two properties may be determined. At 38, based on the score, whether the window is an error block may be determined.

Figure 4:
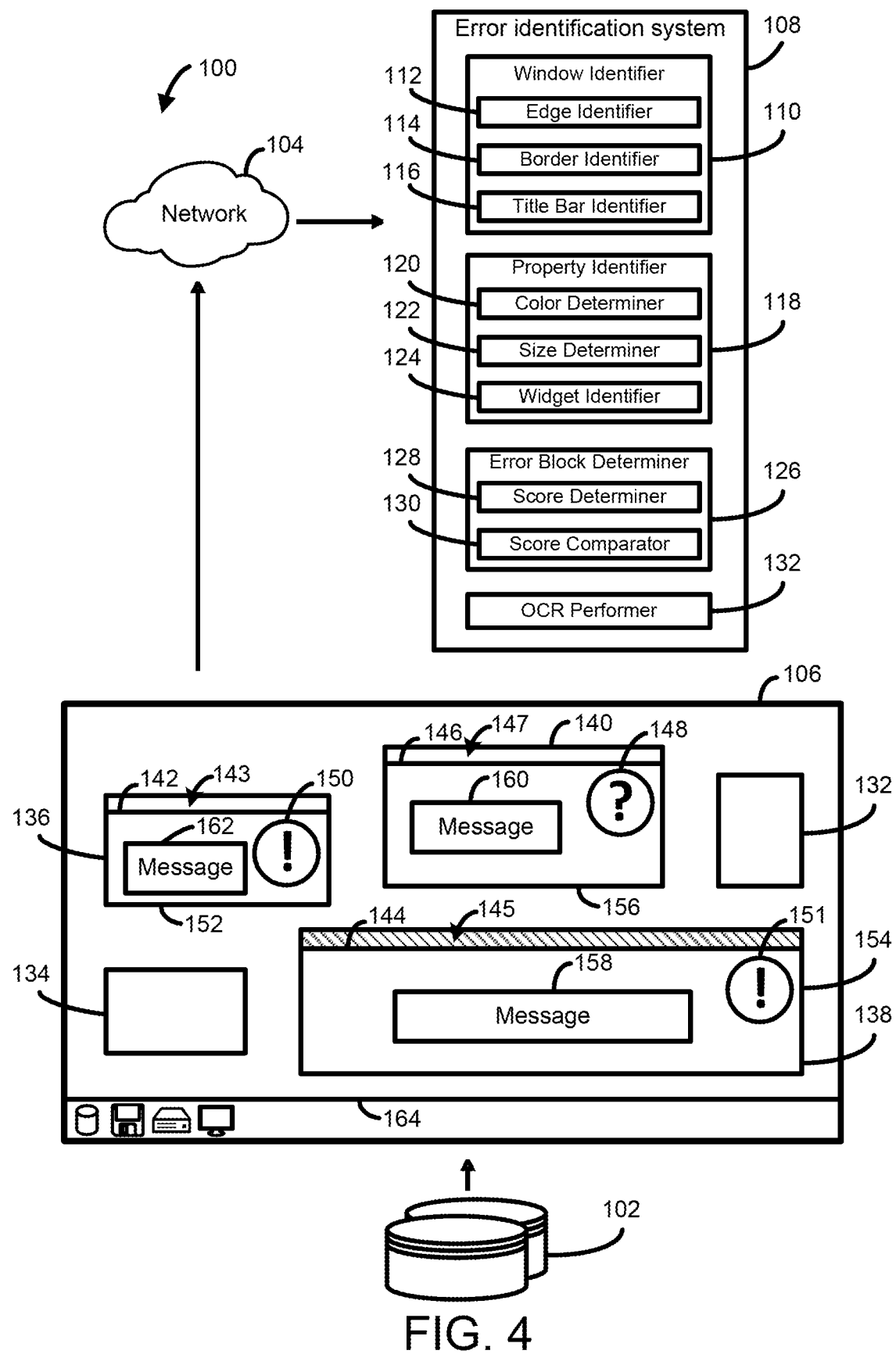

FIG. 4 is a block diagram illustrating a system 100 according to some examples. The system 100 includes a data sources 102, communication network 104, and error identification system 108. The error identification system 108 may include a several components including window identifier 112, property identifier 118, error block identifier, and optical character recognition (OCR) performer 132. The window identifier 110 may include edge identifier 112, border identifier 114 and title bar identifier 116. The property identifier 118 may include color determiner 120, size determiner 122, and widget identifier 124. The error block determiner 126 may include score determiner 128 and score comparator 130.

In some examples, these components of the error identification system 108 may be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, the components may include hardware features to perform processes described herein, such as a logical circuit, application specific integrated circuit, etc. In some examples, multiple components may be implemented using the same computing system features or hardware.

The data sources 102 may, for example, comprise a group of networked computing systems such as servers in a data center, personal computers, and/or may comprise components of the same computing system or multiple computing systems. In other examples, the data sources 102 may comprise any other sources of data. Each of the computing systems may, for example, include components, such as applications, servers, databases, etc., that may exhibit errors.

The error identification system 108 may receive, though a communication interface, image data 106, which may represent an image displayed on a desktop screen while an application is operating, from the at least one of the data sources 102 via the communication network 104. In some examples, multiple sets of different image data 106 may be received such that the error identification system 108 may operate, as described herein, on each set of image data 106. However, for ease of illustration, one set of image data 106 is shown in FIG. 4. In some examples, the image data 106 may be submitted as part of an IT ticket for processing by the error identification system 108.

The network 104 may, for example, be a local area network (LAN), wide area network (WAN), the Internet, or any other network. In some examples, the network 104 may comprise components of an information technology (IT) infrastructure of an organization. The communication interface of the error identification system 108 may include a network interface card (NIC) or another component to receive signals from a communication path, demodulate and/or decode the data from the signals, and/or apply error correction to retrieve data packet(s), header information, etc. in accordance with various communication protocols. The communication interface may also send data to another terminal by generating data packets, header information, and so forth; encoding and/or modulating a signal based on the data to be communicated; and transmitting the signal. Moreover, the communication interface may perform decryption and encryption to facilitate secure communications according to various standards and protocols.

The window identifier 110 may identify windows in the image 106, e.g. by using its edge identifier 112, border identifier 114, and title bar identifier 116.

Figure 5:
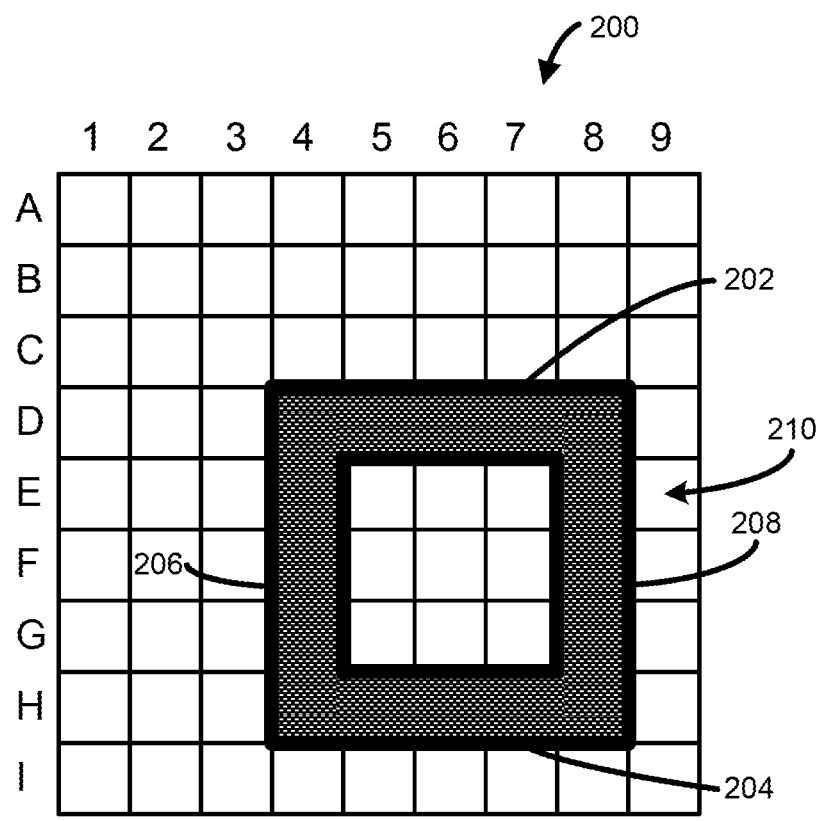
FIG. 5 illustrates an image according to some examples.

In describing the operation of edge identifier 112 and border identifier 114, reference will be made to elements described in FIG. 5, which illustrates an image 200 according to some examples. The edge identifier 112 may identify edges (e.g. straight or curved lines) in the image 200. The image 200 contains 81 pixels in a 9×9 grid, with the rows and columns respectively labeled A-I and 1-9. In some examples, detection of edges may proceed as follows. The edge identifier 112 may identify edges in the image 200 (e.g. all edges in the image). In some examples, any orientation of the edges may be identified, however in other examples the edge identifier 112 may identify horizontal and vertical edges, and may not identify other types of edges. In FIG. 5, two horizontal edges 202 and 204 (one from C3 to C8 and another from H3 to H8) and two vertical edges 204 and 208 (one from C3 to H3 and another from C8 to H8) are shown, wherein each of the edges 202, 204, 206, and 208 have a thickness of a single pixel. When identifying horizontal and vertical edges, the image 106 may be scanned line by line, both horizontally and vertically. In some examples, two lines may be scanned at once. By comparing color contrasts between lines, the edge identifier 112 may identify the edges.

For example, when scanning for horizontal edges, the edge identifier 112 may begin by scanning rows A and B together, then rows B and C, etc. The edge identifier may not detect any color contrasts between pixels when scanning rows A and B together, or when scanning rows B and C together. In some examples, when scanning rows C and D together, the edge identifier 112 may detect a difference (e.g. outside a threshold) in color contrast between pixels C4 and D4, but detect a similarity (e.g. within a tolerance threshold) or equivalence in color contrast between pixels C3 and D3. The edge identifier 112 may therefore determine that there is an edge 202 that starts at D4. The edge identifier 112 may through move across the row, and continue to see a color contrast between pixels C5 and D5, between pixels C6 and D6, between pixels C7 and D7, and between pixels C8 and D8. However, the edge identifier 112 may detect a similarity or equivalence in color contrast that pixels C9 and D9, and therefore may determine that the edge 202 ends at D8. The edge identifier 112 may then detect the other horizontal edge 204 spanning H4 to H8 according to a similar method.

In some examples, the edge identifier 112 may then identify any vertical edges, such as the vertical edge 206 spanning D4 to H4 and the vertical edge 208 spanning D8 to H8 according to a similar method. However, in other examples, the edge identifier 112 may directly determine whether the horizontal edges 202 and 204 are connected by vertical edges. For example, the edge identifier 212 may a difference in color contrast between pixels C4 and D4 and between D3 and D4, and may therefore determine that there is a vertical edge 206 that starts at D4. The edge identifier 112 may through move across the column, and continue to see a color contrast between pixels E3 and E4, between pixels F3 and F4, between pixels G3 and G4, and between pixels H3 and D8. However, the edge identifier 112 may detect a similarity or equivalence in color contrast that pixels 13 and 14, and therefore may determine that the vertical edge 206 ends at H4. The edge identifier 112 may then detect the other vertical edge 208 spanning D4 to D8 according to a similar method. In some examples, vertical edges may be identified before horizontal edges rather than afterward.

In some examples, the edge identifier 112 may not identify a series of pixels as an edge if it does not extend a threshold length (e.g. threshold number of pixels). For example, the edge identifier 112 may discard an edge if it is less than 30 pixels long.

In some examples, an edge may have a thickness of more than one pixel, e.g. the edge may comprise two adjacent series of pixels. In such cases, the edge identifier 112 may count the two adjacent series of pixels as a single edge.

In some examples, the border identifier 114 may identify whether any combination of edges (or a single edge in the case of a circular border) defines a border enclosing an area in the image 200. Each of the identified borders enclosing an area may correspond to a possible window. In examples where horizontal and vertical edges are identified but other edges are not identified, then any of the identified borders may each be rectangular. In the example of FIG. 4, the border 210 enclosing the area within it and defined by edges 202, 204, 206, and 208 is identified. In some examples, each of the borders may not completely enclose the respective area defining the window, for example three out of four edges of a rectangle may be sufficient to identify a border.

Turning back to FIG. 4, the border identifier 114 may identify five borders 132, 134, 136, 138, and 140 enclosing respective areas. These five borders 132, 134, 136, 138, and 140 may be candidates for windows. In some examples, horizontal edge 164 may be detected by the edge identifier 112, but the border identifier 114 may not identify any border formed by the edge 164.

In some examples, the title bar identifier 116 may identify, for each identified border 132, 134, 136, 138, and 140, whether the area enclosed by the border includes a title bar. This may be determined based on whether an additional horizontal edge spans the horizontal width of the area enclosed by the border. In such case, the area between the identified additional horizontal edge and the top horizontal edge of the border (e.g. the top horizontal edge 202 in FIG. 5) may be a title bar. To identify the additional horizontal edge, similar edge detection techniques may be used as those implemented by the edge detector 112.

Based on whether the area enclosed by a border includes a title bar, the title bar identifier 116 may determine whether the border 140 is part of a window. For example, in FIG. 4, the areas within borders 132 and 134 do not include additional horizontal edges, and therefore do not include title bars. Therefore, these borders 132 and 134 are not identified as parts of windows. However, the areas within borders 136, 138, and 140 respectively contain additional horizontal edges 142, 144, and 146 that, along with the top horizontal edges of borders 136, 138, and 140, and parts of the vertical edges, form the title bars 143, 145, and 147. Therefore, these borders 136, 138, and 140 and their title bars 143, 145, and 147 are identified as parts of respective windows 152, 154, and 156. Thus, the window identifier 110 may identify windows 152, 154, and 156 in the image 106.

The property identifier 118 may identify properties of the windows 152, 154, and 156, e.g. by using its color determiner 120, size determiner 122, and widget identifier 124.

In some examples, for each of the title bars 143, 145, and 147 of the identified windows 152, 154, and 156, the color determiner 120 may determine a value representing a color property of the title bar. The color property may, for example, be a color property such as saturation, chroma, brightness, colorfulness, hue, contrast, or the like. The following examples will be described relative to saturation, which is a measure that takes into account colorfulness and intensity. For example, the saturation of a color may be determined by a combination of intensity and the distribution of the color across different wavelengths. In some examples, according to the CIELAB color space specified by the International Commission on Illumination, the saturation $S_{ab}$ may be determined according to the formula:

$$S_{ab} = \frac{\sqrt{a^{*2} + b^{*2}}}{L^*}$$

In this example, L* represents the lightness of a color (where 0 represents black and 100 represents diffuse white), a* represents the color's position between magenta and green (negative values represent green and positive values represent magenta), and b* represents the color's position between yellow and blue (negative values represent blue and positive values represent yellow). In other examples, other measures of saturation may be used.

In some examples, the image may be represented in the CE RGB (red-green-blue) color space. In such examples, each pixel of the title bars (or the image as a whole) may be converted to the CIELAB color space before calculating the saturation. In some examples, the determined saturation value of a title bar may be an average of the values for each pixel within the title bar. In other examples, the determined saturation value of the title bar may be the saturation value for the color that appears most frequently in the title bar. In some examples, each of the saturation values may be within a range of 0 to 1 based on the above formula.

Based on the determination of a respective value represent the color property (e.g. saturation) of the title bars 143, 145, and 147, the color determiner 120 may designate the one of the title bars 143, 145, and 147 with a most extreme value of the color property (e.g. the title bar with the greatest saturation) as a dominant title bar. For example, title bar 145 may have the greatest saturation and therefore may be ranked as the dominant title bar. In some examples, according to the theory of visual saliency, human eyes may be better able to notice an area that has a high saturation and is a different color than the background. Therefore, error blocks may be generated with high saturation values so that a human may notice the error block in a first glance. Thus, a high saturation of a title bar may indicate that the window associated with that title bar is more likely to be an error block.

In some examples, for each of the identified windows 152, 154, and 156, the size determiner 122 may determine value representing a size of the window. For each of the identified windows 152, 154, and 156, the size may, for example, be an area within the respective border 136, 138, or 140. In some examples, the value representing the size (e.g. area) may be a number of pixels within with respective border 136, 138, or 140. This value may then be normalized by dividing by 1,000,000. In other examples, other measures of size may be used, for example a width or length of the window.

In some examples, for each of the identified windows 152, 154, and 156, the widget identifier 124 may identify any widgets in the window. In some examples, the widget identifier 124 may compare any features in the window with sample widgets in a widget library. The sample widgets may be expected to be associated with an error block. For example, the widgets in the widget library may include icons, for example an error icon or warning icon. If the widget identifier 124 determines a match between the feature in the window and a widget in the widget library, then the widget identifier 124 may classify the feature as an identified widget.

In some examples, the widget identifier 124 may use the SURF (Speeded Up Robust Features) algorithm to scan the windows and perform the comparison. Features extracted from an image may be detectable for different image sizes and scales, and different levels of noise and illumination in the image. Thus, the identified features may lie on high-contrast regions of the image, such as near the edge of a window.

In some examples, a widget may comprise multiple separated points of interest. For example, the four corners of a door may be used as four interest points with fixed relative distances between one another, such that the four corners could be identified irrespective of the location or scale of the door.

In the example of FIG. 4, the widget identifier 124 may identify features 150 and 151 in respective windows 152 and 154 as widgets. The features 150 and 151 may be associated with errors. However, the widget identifier 124 may not identify feature 148 as a widget, as feature 148 may not be associated with errors.

In some examples, the property identifier 118 may identify additional properties relative to those identified by the color determiner 120, size determiner 122, and widget determiner 124.

The error block determiner 126 may determine, for each identified window 152, 154, and 156, and based on the at least one property identified by the property determiner 118, whether the respective window is an error block. The error block determiner 126 may perform this task, for example, by using its score determiner 128 and score comparator 130.

In some examples, the score determiner 128 may determine a score representing a sum of a first weight multiplied by a first value representing the first property and a second weight multiplied by a second value representing the second property. In some examples, depending on the number of properties of the window detected by the property identifier 118, any additional number of weights multiplied by values representing properties may be added to the sum. In some examples, a constant may be added to the sum. In some examples, the score may be determined according to the formula:

$$score = w_1 \times saturation + w_2 \times \text{number of widgets} + w_3 \times \text{window size} + b.$$

Thus, in this example, the score of a window may represent a sum of a first weight multiplied by the saturation value $S_{ab}$ determined by the color determiner 120, a second weight multiplied by the number of widgets identified by the widget identifier 124, a third weight multiplied by the size of the window determined by the size determiner 122. In this example, the saturation value may be within the range of 0 and 1 as mentioned earlier, the number of widgets may be less than 10 in most examples, and the size may be the number of pixels in the window divided by 1,000,000 as mentioned earlier.

In some examples, a threshold score may define the score above which the window is to be classified as an error block. Therefore, in some examples, the score comparator 130 may, for each of the identified windows 152, 154, and 156, compare the score for the window to the threshold score. In addition, the score comparator 130 may determine which of the determined scores is the highest. In response to a score exceeding the threshold score and being the highest determined score associated with any window in the image 106, the score comparator 130 may determine that the window is an error block. This example may be used where no more than a single error block may be expected to pop up on a screen at a given time. In other examples, any windows whose scores exceed the score threshold, irrespective of whether the window is the highest determined score associated with any window in the image 106, the score comparator 130 may determine that the window associated with the score is an error block. This example may be used where multiple error blocks may be expected to pop up on a screen at a given time.

In the example of FIG. 4, the score comparator 130 may determine that the scores associated windows 152 and 154 exceed the threshold score but that the score associated with window 156 does not exceed the threshold score. Additionally, the score comparator 130 may determine that the score associated with window 154 is the highest score. Therefore, the score comparator 130 may determine that the window 154 is an error block. Additionally, in examples where any windows whose scores exceed the score threshold, irrespective of whether the window is the highest determined score associated with any window in the image 106, the score comparator 130 may determine that the window 152 is also an error block.

In some examples, the parameters $w_1$, $w_2$, $w_3$, and b may be based on a support vector machine (SVM) training model. For example, given a score threshold, and a training set of windows where it is known which of the windows are error blocks, the SVM training model may determine values for the parameters $w_1$, $w_2$, $w_3$, and b for use by the score determiner 128 to generate optimal values to increase the true positive and true negative rates, and decrease the false positive and false negative rates.

In an experimental example, a training set of 300 windows were used by the SVM model to determine models the following values for the parameters: $w_1$=4.26395, $w_2$=0.34763, $w_3$=−1.49507, and b=−0.77221. Additionally, in the experimental example, 1582 images were then analyzed using the error identification system 108 to yield 343 true positives (21.7%), 1116 true negatives (70.5%), 43 false positives (2.7%), and 80 false negatives (5.1%), for an overall correct identification rate of 92.2%.

In some examples, the OCR performer 132 may perform OCR on text in any windows identified to be error blocks. The text may include error messages. For example, the OCR performer 132 may perform OCR on text 158 in the window 154 identified as an error block. Additionally, in some examples, the OCR performer 132 may perform OCR on text 162 if the window 152 is also identified as an error block. However, the OCR performer 132 may not perform OCR on text 160, as window 156 may not be identified as an error block.

Figure 6:
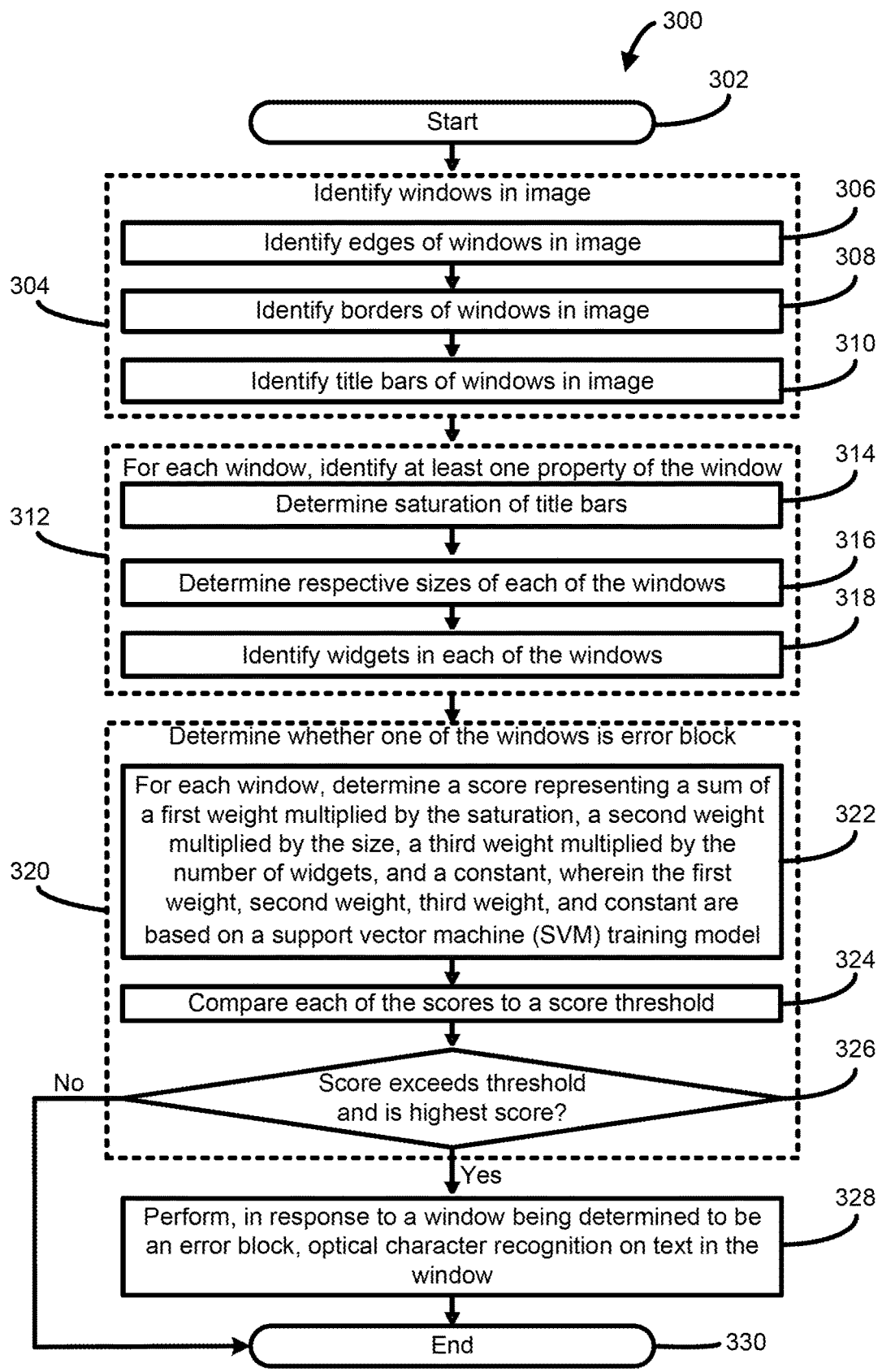

FIG. 6 is a flow diagram illustrating a method 300 according to some examples. In some examples, the orderings shown may be varied, some elements may occur simultaneously, some elements may be added, and some elements may be omitted. In describing FIG. 6, reference will be made to elements described in FIG. 4. In examples, any of the elements described earlier relative to FIG. 4 may be implemented in the process shown in and described relative to FIG. 6.

At 302, the method 300 may start.

At 304, the window identifier 110 may identify windows in the image 106, e.g. by using its edge identifier 112 to identify edges at 306, border identifier 114 to identify borders at 308, and title bar identifier 116 to identify title bars at 310. Any processes previously described as implemented by the window identifier 110, edge identifier 112, border identifier 114, and title bar identifier 116 may be implemented at 304, 306, 308, and 310.

At 312, the property identifier 118 may identify properties of the identified windows, e.g. by using its color determiner 120 to determine color properties (e.g. saturation) of title bars, size determiner 122 to determine sizes of windows, and widget identifier 124 to identify widgets in the windows. Any processes previously described as implemented by the property identifier 118, color determiner 120, size determiner 122, and widget identifier 124 may be implemented at 312, 314, 316, and 318.

At 320, the error block determiner 126 may determine, for each identified window, and based on the at least one property identified by the property determiner 118, whether the respective window is an error block. The error block determiner 126 may perform this task, for example, by using its score determiner 128 at 322 and score comparator 130 at 322. Any processes previously described as implemented by the error block determiner 126, score determiner 128, size determiner 122, and score comparator 130 may be implemented at 320, 322, and 324.

At 326, if any of the scores (determined by score determiner 128) associated with any of the windows in an image exceeds the threshold score and is the highest score associated with any of the windows in the image, then the method 300 may identify the window associated with the highest score as an error block and proceed to 328. In some examples, the condition that the score is the highest score associated with any window in the image may not be used, such that e.g. multiple scores may be classified as error blocks. In these examples, the method may also proceed to 328. If none of the scores exceed the threshold score, then the method may proceed to 330.

At 328, the OCR performer 132 may perform OCR on text in any windows identified to be error blocks.

At 330, the method may end.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions that, when executed by a processor, cause the processor to:
   identify a first window in an image;
   determine whether the first window includes a title bar, by causing the processor to determine whether the first window includes another horizontal line inside the first window underneath a top horizontal edge of the first window;
   in response to a determination that the first window includes the title bar, determine properties of the first window, including causing the processor to:
      identify a first widget in the first window that matches a sample widget associated with an error, and
      determine a value representing a color property of the title bar in the first window, wherein the value representing the color property indicates a level of saturation, chroma, brightness, or contrast of the title bar;
   determine a first score for the first window based on the properties of the first window; and
   determine whether the first window is an error block based on a determination of whether the first score for the first window exceeds a threshold score.

2. The non-transitory computer-readable storage medium of claim 1, wherein the instructions that cause the processor to determine the properties of the first window include instructions that cause the processor to:
   determine a size of the first window.

3. The non-transitory computer-readable storage medium of claim 1, wherein the instructions, when executed by the processor, further cause the processor to determine the first score based on the value representing the level of saturation of the title bar.

4. The non-transitory computer-readable storage medium of claim 1, wherein the instructions, when executed by the processor, further cause the processor to:
   identify a second window in the image;
   determine a second score for the second window; and
   determine, based on the first score and the second score, which of the first window and the second window is the error block.

5. The non-transitory computer-readable storage medium of claim 1, wherein the instructions, when executed by the processor, further cause the processor to determine the value representing the color property of the title bar based on a plurality of pixels associated with a color that appears most frequently in the title bar.

6. The non-transitory computer-readable storage medium of claim 1, wherein the instructions, when executed by the processor, further cause the processor to identify a total number of widgets in the first window and determine the first score for the first window further based on the total number of widgets in the first window.

7. The non-transitory computer-readable storage medium of claim 1, wherein the sample widget associated with the error is stored in a widget library, and the first widget in the first window comprises an icon associated with the error.

8. The non-transitory computer-readable storage medium of claim 1, wherein the instructions that cause the processor to identify the first window in the image comprise instructions that cause the processor to determine a border of the first window in the image.

9. The non-transitory computer-readable storage medium of claim 8, wherein the border is rectangular and encloses the first window.

10. The non-transitory computer-readable storage medium of claim 9, wherein the instructions, when executed by the processor, further cause the processor to identify edges in the image that exceed a threshold length, and determine the edges from the border.

11. The non-transitory computer-readable storage medium of claim 1, wherein the instructions, when executed by the processor, further cause the processor to perform, in response to the first window being determined to be the error block, optical character recognition on the first window to identify text in the first window.

12. The non-transitory computer-readable storage medium of claim 1, wherein the instructions, when executed by the processor, further cause the processor to:
   assign a weight to each property of the properties of the first window to provide weighted values;
   combine the weighted values to determine the first score for the first window;
   compare the first score for the first window to the threshold score; and
   in response to the first score for the first window exceeding the threshold score, determine that the first window is the error block.

13. The non-transitory computer-readable storage medium of claim 1, wherein the instructions, when executed by the processor, further cause the processor to determine the first score for the first window based on a support vector machine (SVM) training model.

14. A system comprising:
   a processor; and
   a memory comprising instructions executable to cause the processor to:
      identify a first window in an image;
      determine whether the first window includes a title bar, including causing the processor to determine whether the first window includes another horizontal line inside the first window underneath a top horizontal edge of the first window;

in response to a determination that the first window includes the title bar, determine properties of the first window, including causing the processor to:
  identify a first widget in the first window that matches a sample widget associated with an error, and
  determine a value representing a color property of the title bar in the first window, wherein the value representing the color property indicates a level of saturation, chroma, brightness, or contrast of the title bar;

determine a score for the first window based on the at least two properties of the first window; and determine whether the first window is an error block based on a determination of whether the score of the first window exceeds a threshold score.

15. A method comprising:
by a processor:
  identifying a first window in an image;
  determining whether the first window includes a title bar, by determining whether the first window includes another horizontal line inside the first window underneath a top horizontal edge of the first window;
  in response to a determination that the first window includes the title bar, determining properties of the first window, including:
    identifying a first widget in the first window that matches a sample widget associated with an error, and
    determining a value representing a color property of the title bar in the first window, wherein the value representing the color property indicates a level of saturation, chroma, brightness, or contrast of the title bar;
  determining a score for the first window based on the properties of the first window; and
  determining whether the first window is an error block based on a determination of whether the score for the first window exceeds a threshold score.

16. The system of claim 14, wherein the instructions that cause the processor to determine the properties of the first window include instructions that cause the processor to:
  determine a size of the first window.

17. The system of claim 14, wherein the instructions are further executable by the processor to:
  determine a most frequently occurring color in the title bar; and
  determine the value representing the level of saturation of the title bar based on the most frequently occurring color.

18. The system of claim 14, wherein the instructions are further executable by the processor to:
  determine saturation values for pixel values of the title bar; and
  determine the value representing the level of saturation of the title bar based on an average of the saturation values.

19. The method of claim 15, wherein:
  determining the properties of the first window comprises determining the value representing the level of saturation of the title bar; and
  determining the value representing the level of saturation of the title bar comprises:
    determining a color associated with the title bar; and
    determining the value representing the level of saturation based on a lightness of the color and a distribution of the color among different wavelengths.

20. The method of claim 15, wherein determining the score for the first window comprises:
  applying a support vector machine (SVM) model to determine weights to associated with the properties of the first window; and
  determining the score for the first window based on the weights associated with the properties of the first window.

* * * * *